May 14, 1946.  W. J. WILSON  2,400,451
FIRE TOOL
Filed Sept. 21, 1943
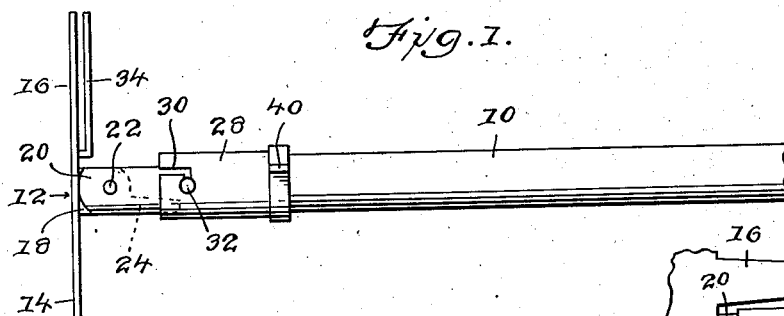
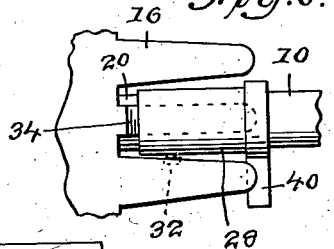
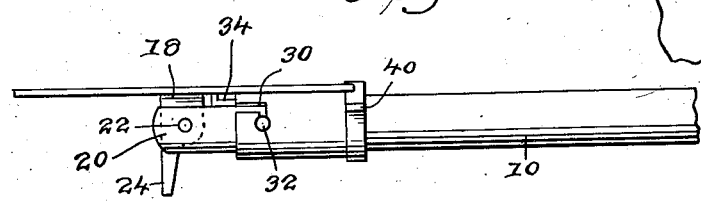
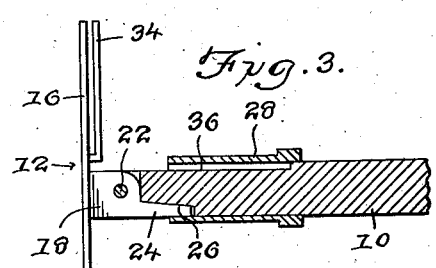
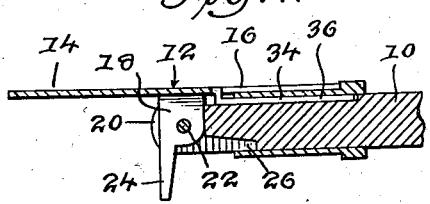
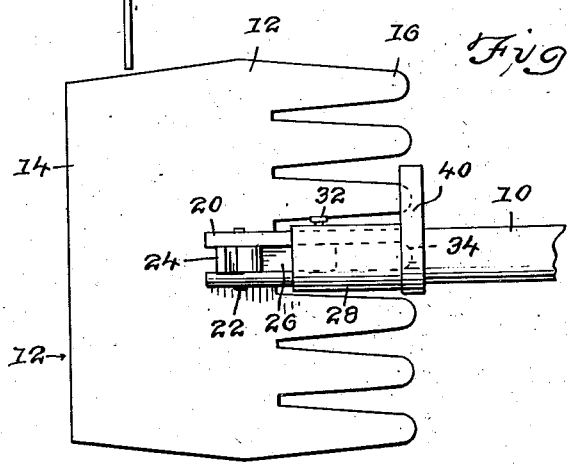
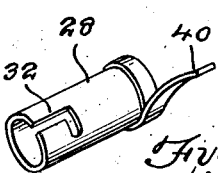
INVENTOR.
William J. Wilson
BY
Victor J. Evans & Co.
ATTORNEYS Patented May 14, 1946

2,400,451

UNITED STATES PATENT OFFICE 2,400,451

FIRE TOOL

William J. Wilson, Tehachapi, Calif.

Application September 21, 1943, Serial No. 503,293

2 Claims. (Cl. 306—18)

My invention relates to manual ground working tools, and has among its objects and advantages the provision of an improved combination hoe or scraper, rake and spade particularly suitable for extinguishing and preventing forest and ground surface fires.

In the accompanying drawing:

Figure 1 is a side elevational view of the device in its hoe and rake position;

Figure 2 is a similar view with the tool conditioned for spading purposes;

Figure 3 is a sectional view of the handle structure with the tool conditioned according to Figure 1;

Figure 4 is a view similar to Figure 3 but with the tool conditioned for spading purposes;

Figure 5 is a face view of the tool in its spading position;

Figure 6 is a detail view illustrating the manner in which the tool is latched in its spading condition together with a foot pressure member; and Figure 7 is a perspective view of a latch sleeve.

In the embodiment selected for illustration, I make use of a handle 10 in the nature of an ordinary rake handle. To one end of the handle is attached a blade 12, half of which comprises a hoe or scraper portion 14 and the other half a tined rake portion 16. A body 18 is welded to the blade 12 centrally thereof. This body is flat and is located in a slot 20 in the end of the handle and pivotally connected therewith by a pin 22.

Projecting from the body 18 is a finger 24 arranged to lie in a recess or groove 26 in the side of the handle when the blade 12 is pivoted to a position at right angles to the handle. Means for latching the blade in the position of Figures 1 and 3 comprises a sleeve 28 slidable on the handle 10. This sleeve latches the finger 24 firmly in the groove 26.

A bayonet slot 30 is provided in the sleeve 28 for the reception of a pin 32 attached to the handle 10 to restrain the sleeve from accidental shifting on the handle in its latching position. With the blade 12 positioned according to Figures 1 and 3, both the hoe or scraper portion 14 and the rake portion 16 are in working positions.

Figures 2, 4 and 5 illustrate the blade 12 positioned for spading purposes. A finger 34 is welded to the blade 12 and is shaped to lie in parallel and slightly spaced relationship therewith. A second groove 36 is provided in the handle 10 to receive the finger 34 when the blade 12 is pivoted to the position of Figures 2, 4 and 5. The sleeve 28 slips over the finger 34 to hold it firmly in the groove.

A foot piece 40 is welded to the sleeve 28 in right angular relationship therewith. This foot piece lies slightly rearwardly of the rake portion 16 when the pin 32 lies in the bayonet slot 30, as in Figures 1 and 2, so that foot pressure may be employed to press the hoe portion 14 into the ground for spading purposes.

Without further elaboration, the foregoing will so fully illustrate my invention, that others may, by applying current knowledge, readily adapt the same for use under various conditions of service.

I claim:

1. A tool of the type described comprising a handle having a slot in the end thereof and finger recesses adjacent said slot, a blade, a flat body mounted midway the edges of the blade and having a finger formed thereon, said body pivoted in the slot, and lying in one position with the finger nested in a recess, a finger of the same length of the blade formed on the blade and spaced from and lying parallel thereto, and in another position of the body and blade with the finger in the other recess, a sleeve slidable on the handle, and movable to position to selectively lock one of said fingers in one of the recesses to selectively fix the positions of the blade, a pin on the handle, and a bayonet slot in the sleeve in which the pin is adapted to engage to fix the position of the sleeve.

2. The invention as described in claim 1 wherein said sleeve when in locked position lies in the space formed between said blade and said finger on said blade.

WILLIAM J. WILSON.